US011863565B2

(12) United States Patent
Gagnon

(10) Patent No.: US 11,863,565 B2
(45) Date of Patent: Jan. 2, 2024

(54) SYSTEM AND METHOD FOR SECURING ACCESS TO NETWORK ASSETS

(71) Applicant: TACTIKA.COM INC., Québec (CA)

(72) Inventor: Clément Gagnon, Québec (CA)

(73) Assignee: TACTIKA.COM INC., Quebec (CA)

(*) Notice: Subject to any disclaimer, the term of this patent is extended or adjusted under 35 U.S.C. 154(b) by 349 days.

(21) Appl. No.: 17/206,892

(22) Filed: Mar. 19, 2021

(65) Prior Publication Data

US 2021/0297423 A1 Sep. 23, 2021

Related U.S. Application Data

(60) Provisional application No. 62/992,549, filed on Mar. 20, 2020.

(51) Int. Cl.
*H04L 9/40* (2022.01)
*G06F 9/455* (2018.01)

(52) U.S. Cl.
CPC ........ *H04L 63/108* (2013.01); *G06F 9/45558* (2013.01); *G06F 9/45554* (2013.01); *G06F 2009/45595* (2013.01)

(58) Field of Classification Search
CPC .............. H04L 63/108; H04L 61/3025; H04L 61/4511; H04L 63/0236; G06F 9/45558; G06F 9/45554; G06F 2009/45595
See application file for complete search history.

(56) References Cited

U.S. PATENT DOCUMENTS

| RE44,207 E | 5/2013 | Schneider |
| 8,533,796 B1 | 9/2013 | Shenoy et al. |
| 9,237,019 B2 | 1/2016 | Roth et al. |
| 9,274,821 B2 | 3/2016 | Chawla |

(Continued)

FOREIGN PATENT DOCUMENTS

WO  WO-2017075492 A1 *  5/2017  ......... G06F 9/45558

OTHER PUBLICATIONS

Lu, Zhaohui and Liu, Jianing, Design and Implementation of Dynamic Domain Name System Based on Bind, IEEE, 2009 International Symposium on Computer Network and Multimedia Technology (Year: 2009).*

(Continued)

*Primary Examiner* — Bruce S Ashley
(74) *Attorney, Agent, or Firm* — FisherBroyles, LLC; Craig W. Mueller

(57) ABSTRACT

A system for securing access to a network asset and including a launcher and a master each configure to generate a new unique and temporary hostname and virtual machines each having an IP address associated to a corresponding generated unique, secret and temporary hostname. Each virtual machine operates either as a server hosting the network asset or a reverse proxy or a firewall between a client device having the launcher stored in the memory thereof and the corresponding network asset. A new virtual machine is created each time a new hostname is generated and is destructed after the corresponding hostname expires. The system also includes a DNS server storing a database of host records each including a public IP address of one of the virtual machines and the corresponding hostname, the database of host records being updated each time a new virtual machine is created in a DNS domain.

17 Claims, 6 Drawing Sheets

(56) References Cited

U.S. PATENT DOCUMENTS

| | | | |
|---|---|---|---|
| 9,635,027 B1 | 4/2017 | Luzader | |
| 9,756,020 B2 | 9/2017 | Kaufman | |
| 9,887,970 B2 | 2/2018 | Luff et al. | |
| 10,033,741 B2 | 7/2018 | Luzader | |
| 10,356,621 B2 | 7/2019 | Singleton | |
| 10,880,334 B2 * | 12/2020 | Froelicher | H04L 67/01 |
| 2010/0042636 A1 * | 2/2010 | Lu | H04L 67/08 |
| | | | 707/E17.044 |
| 2015/0264105 A1 | 9/2015 | Smith | |
| 2015/0381711 A1 * | 12/2015 | Singh | H04L 41/12 |
| | | | 709/221 |
| 2016/0127447 A1 | 5/2016 | Jiang | |
| 2016/0197909 A1 | 7/2016 | Innes | |
| 2017/0279912 A1 | 9/2017 | Zhang et al. | |
| 2017/0329957 A1 | 11/2017 | Vepa et al. | |
| 2017/0331789 A1 | 11/2017 | Kumar | |
| 2018/0295134 A1 | 10/2018 | Gupta et al. | |
| 2019/0004826 A1 * | 1/2019 | Ryan | H04L 61/3025 |

OTHER PUBLICATIONS

How to Generate Temporary URLs in DJANGO—Stack Overflow. 6 Pages. 2009.

* cited by examiner

SYSTEM AND METHOD FOR SECURING ACCESS TO NETWORK ASSETS

CROSS-REFERENCE TO RELATED APPLICATIONS

This application claims priority under 35 USC § 119(e) of U.S. provisional patent application 62/992,549 filed on Mar. 20, 2020, the specification of which being hereby incorporated by reference.

TECHNICAL FIELD OF THE INVENTION

The present invention relates to the field of information security systems. More particularly, it relates to a system and a method for securing access to network assets (such as, for example and without being limitative, network services, applications or resources). For example, the system and a method can be used to allow access to the network assets only by authorized clients such as an individual, a group of individuals, a machine, a group of machines, a software component, an IoT device, etc.

BACKGROUND

Network assets such as, for example and without being limitative, network services, applications, resources, information, etc. are conventionally hosted on server(s) (i.e. either an individual server or a plurality of servers, which can be virtual or physical) connected to a network such as the Internet. Each one of the network assets is accessible via an Internet Protocol address (IP address version 4 or version 6) and a TCP/IP Protocol Suite associated therewith and used to identify and access the corresponding asset.

For example, in order to access the corresponding network asset, a client, such as a human user, can use a Web browser or a software with networking capability on a client device, such as, for example, a personal computer, a smartphone, or the like, to either directly connect to the corresponding server(s) using the Internet Protocol address of the network asset or connect to the server using a hostname and a domain name. The client can also be an IoT (Internet of Thing) device who wants to communicate with a server, a service, or the like. The hostname and the domain name are translated with a system called domain name system (DNS) which translates the hostname and the domain name to the corresponding IP address or vice-versa.

As mentioned above, the combination of the hostname and the domain name is called the Full Qualified Domain Name (FQDN). The DNS system use this combination to find the IP address of a resource.

A web browser uses a uniform resource locator (URL) to connect to a resource (web server). The FQDN is a part of a URL.

Other clients such as connected objects or the like can also connect to the network assets, through the network using the IP address, the FQDN or a hostname.

Using traditional access method, the network assets are mostly configured to be easily located and accessed permanently through a FQDN. Consequently, in traditional systems, the network assets are potentially exposed and can be easy targets for malicious activities, such as, for example and without being limitative, distributed denial of service attacks (DDOS), scanning by bots looking for vulnerable hosts, forbidden access attempts, etc.

In order to provide enhanced security for network assets access, it is known in the art to use, systems such as network firewalls or reverse proxies. Such a solution limits the points of access to network assets, but still provides a static architecture to allow access to the network assets. Therefore, even though such systems do increase the security for access to the network assets, they nevertheless suffer from security drawbacks, given that they still allow a known point of access to the network assets.

In view of the above, there is a need for an improved system and method for securing access to network assets which would be able to overcome or at least minimize some of the above-discussed prior art concerns.

SUMMARY OF THE INVENTION

In accordance with a first general aspect, there is provided a system for securing access to a network asset using a fully qualified domain name having a unique and temporary hostname. The system comprises: a client-side module stored in a memory of a client device connected to a network and configured to generate, on demand, the fully qualified domain name having the unique and temporary hostname; a server-side module stored in a memory of a computing device connected to the network, the server-side module being configured to periodically generate the fully qualified domain name having the unique and temporary hostname; virtual machines each having an IP address associated to a corresponding fully qualified domain name having the unique and temporary hostname, each one of the virtual machines being configured to operate either as a server hosting the network asset, a network firewall or a reverse proxy between the client device having the client-side module stored in the memory thereof and the corresponding network asset, a new virtual machine being created each time a new fully qualified domain name having the unique and temporary hostname is generated and being destroyed after the corresponding fully qualified domain name having the unique and temporary hostname has expired; and a DNS server connected to the network and storing a database of host records each including a public IP address of one of the virtual machines and the corresponding fully qualified domain name having the unique and temporary hostname, the database of host records being updated each time a new virtual machine is created in a DNS domain.

In an embodiment, the server-side module and the client-side module are configured to generate the unique and temporary hostname using a combination of a shared secret key associated to a client who is allowed to access the network asset, a string representative of the universal time at the time of creation thereof and at least one logical operation.

In an embodiment, the server-side module is configured to generate the unique and temporary hostname at after a predetermined time period corresponding to a cycle time of the system has elapsed.

In an embodiment, the server-side module is configured to create a corresponding host record for the fully qualified domain name having the unique and temporary hostname and the IP address of the associated virtual machine on the DNS server, each time a new virtual machine is created.

In an embodiment, the server-side module is configured to delete the corresponding host record for the fully qualified domain name having the unique and temporary hostname and the IP address of the associated virtual machine, after the associated virtual machine is destroyed.

In an embodiment, the server-side module is configured to generate the fully qualified domain name having the unique and temporary hostname for each cycle, the server-side module and the client-side module generating an identical fully qualified domain name having the unique and temporary hostname during a corresponding cycle.

In an embodiment, the client-side module is configured to connect to the corresponding virtual machine through a browser or a network application, using the corresponding fully qualified domain name having the unique and temporary hostname, to access the network asset.

In accordance with another general aspect, there is provided a system for securing access to a network asset using fully qualified domain names each having a unique and temporary hostname and each expiring after a cycle. The system comprises: a client device connected to a network and having a memory, the client device having a client-side module stored in the memory thereof; virtual machines each having an IP address and each being associated to one of the fully qualified domain names having the unique and temporary hostname, each one of the virtual machines being configured to operate either as a server hosting the network asset, as a reverse proxy, or as a firewall between the client device and the corresponding network asset; a DNS server connected to the network and configured to store host records each including the IP address of one of the virtual machines and the corresponding fully qualified domain name having the unique and temporary hostname associated thereto; and a computing device connected to the network and having a memory, the computing device having a server-side module stored in the memory thereof, the server-side module being configured to generate one fully qualified domain name having the unique and temporary hostname at the beginning of each cycle, the client-side module being configured to generate, on demand, the one fully qualified domain name having the unique and temporary hostname, the one fully qualified domain name having the unique and temporary hostname expiring at the end of the cycle, and, for each cycle, the server-side module being further configured to create one of the virtual machines corresponding to the generated fully qualified domain name having the unique and temporary hostname and to update the DNS server with a corresponding host record including the IP address of the virtual machine created in the cycle and the corresponding fully qualified domain name having the unique and temporary hostname In an embodiment, the server-side module is configured to periodically destroy the virtual machine corresponding to an expired fully qualified domain name having the unique and temporary hostname.

In an embodiment, the server-side module is configured to destroy the virtual machine corresponding to a last expired fully qualified domain name having the unique and temporary hostname, for each cycle.

In an embodiment, the server-side module is configured to update the DNS server to remove the host records including the IP address virtual machines corresponding to expired fully qualified domain names having the unique and temporary hostname.

In an embodiment, the at least one of the server-side module and the client-side module is configured to generate the unique and temporary hostname using a combination of a shared secret key associated to a client who is allowed to access the network asset, a string representative of the universal time at the time of creation thereof and at least one logical operation.

In an embodiment, the server-side module is configured to generate one fully qualified domain name having the unique and temporary hostname at the beginning of each cycle, the server-side module and the client-side module generating an identical fully qualified domain name having the unique and temporary hostname during a corresponding cycle.

In an embodiment, the client-side module is configured to connect to the corresponding virtual machine through a browser or a network application, using the corresponding fully qualified domain name having the unique and temporary hostname, to request the network asset.

In accordance with another general aspect, there is provided a system for securing access to a network asset. The system comprises: a DNS server storing host records; a client-side module stored in a memory of a client device connected to a network; a server-side module stored in a memory of a computing device connected to the network, at least one of the client-side module and the server-side module dynamically generating fully qualified domain names having complex, unique and temporary hostnames combining a unique secret key and a string representative of the universal time at the time of creation of the corresponding one of the fully qualified domain names, each one of the fully qualified domain names expiring after a predetermined time period; and a group of temporary virtual machines each operating either as a server hosting the network asset, a reverse proxy or a firewall between the client device and the network asset, each virtual machine being accessible by the client device, using a corresponding one of the fully qualified domain names having the complex, unique and temporary hostname generated by the at least one of the client-side modules and the server-side module. The server-side module dynamically creates a corresponding virtual machine when one of the fully qualified domain names is generated and destroys the corresponding virtual machine when the one of the fully qualified domain names expires and dynamically updates the host records in the DNS server to reflect the current state of the group of virtual machines.

In an embodiment, the server-side module and the client-side module are configured to generate identical unique and temporary fully qualified domain names, a new fully qualified domain name being generated by the server-side module each time a corresponding one of the fully qualified domain names expires after the predetermined time period has elapsed.

In an embodiment, the client-side module is configured to connect to the corresponding virtual machine through a browser or a network application, using the corresponding unique and temporary fully qualified domain name, to request the network asset.

In accordance with another general aspect, there is provided a method for securing access to a network asset using an active fully qualified domain name having a unique and temporary hostname. The method comprises: for each cycle corresponding to a time period where the fully qualified domain names having the unique and temporary hostname remains active before expiring, performing the steps of: generating the unique and temporary hostname by combining a shared secret key and a string representative of the universal time at the time of creation of the corresponding hostname; appending the hostname to a domain name associated with the corresponding network asset to generate the active fully qualified domain name; creating a corresponding virtual machine assigned to the active fully qualified domain name and acquiring the IP address associated to the virtual machine, the virtual machine being configured to operate either as a server hosting the network asset, as a reverse proxy, or as a firewall for requesting the network asset; and creating an host record of the active fully qualified domain name and the IP address of the associated virtual machine in a DNS server associated to the domain where the network asset is hosted.

In an embodiment, the method further comprises for each cycle, performing the steps of: destroying the virtual machine assigned to an expired fully qualified domain name; and destroying the host record in the DNS server corresponding to the expired fully qualified domain name.

In an embodiment, the method further comprises the step of generating the shared secret key associated to a client or a group of clients.

In an embodiment, the method further comprises requesting access to the network asset by a client-side module installed in a memory of a client device connected to a network, using the active fully qualified domain name.

In an embodiment, the step of requesting access to the network asset comprises querying the DNS server to resolve the fully qualified domain name and connecting to the corresponding virtual machine through the network, to access the network asset.

BRIEF DESCRIPTION OF THE DRAWINGS

Other objects, advantages and features will become more apparent upon reading the following non-restrictive description of embodiments thereof, given for the purpose of exemplification only, with reference to the accompanying drawings in which.

DETAILED DESCRIPTION

Figure 1:
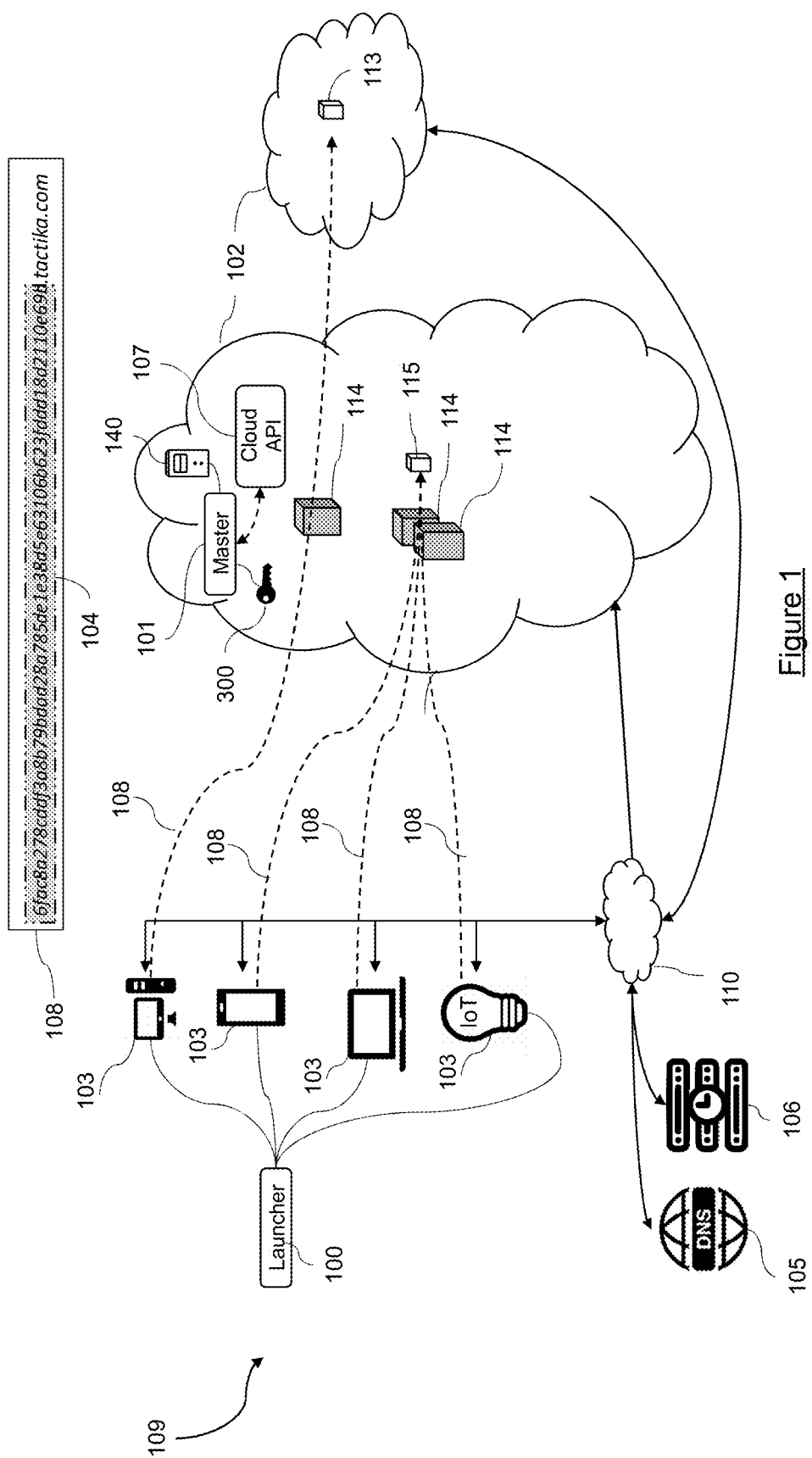
FIG. 1 is a schematic representation of the system for securing access to specific network assets, in accordance with an embodiment where the virtual machines of the system are configured to operate as reverse proxies or a firewall between client devices and the corresponding network assets.

In the following description, the same numerical references refer to similar elements. The embodiments, geometrical configurations, materials mentioned and/or dimensions shown in the figures or described in the present description are embodiments only, given solely for exemplification purposes.

Although the embodiments of the system for securing the access to the network assets and corresponding parts thereof can consist of certain components as explained and illustrated herein, not all of these components and configurations are essential and thus should not be taken in their restrictive sense. It is to be understood, as also apparent to a person skilled in the art, that other suitable components and cooperation thereinbetween, as well as other suitable configurations, may be used for the system for securing the access to the network assets, as will be briefly explained herein and as can be easily inferred herefrom by a person skilled in the art. Moreover, it will be appreciated that positional descriptions such as "above", "below", "left", "right" and the like should, unless otherwise indicated, be taken in the context of the figures and should not be considered limiting.

Moreover, although the associated method includes steps as explained and illustrated herein, not all of these steps are essential and thus should not be taken in their restrictive sense. It will be appreciated that the steps of the method for securing access to the network assets of a network described herein may be performed in the described order, or in any suitable order.

To provide a more concise description, some of the quantitative and qualitative expressions given herein may be qualified with the terms "about" and "substantially". It is understood that whether the terms "about" and "substantially" are used explicitly or not, every quantity or qualification given herein is meant to refer to an actual given value or qualification, and it is also meant to refer to the approximation to such given value or qualification that would reasonably be inferred based on the ordinary skill in the art, including approximations due to the experimental and/or measurement conditions for such given value.

The term "network asset" is used to refer to different types of elements accessible through a network such as, for example and without being limitative network services, network applications (i.e. applications running at the network application layer and above and providing at least one of data storage, manipulation, presentation, communication, etc.), network resources (i.e. data, information and hardware devices accessible from a remote computer through a network), etc.

The term "client" is used to refer to different entities, such as, for instance, a single individual, a group of individuals, a machine, a group of machines, an IoT device or any other entity which could require access to the network asset.

The term "Domain Name System (DNS)" is used to refer to the distributed database used over the Internet to translate Fully Qualified Domain Name (FQDN) into IP addresses and vice & versa and to provide other domain-related information relative to a FQDN.

The term "Fully Qualified Domain Name (FQDN)" is used to refer to a domain name that specifies its exact location in the tree hierarchy of the DNS.

The term "Hostname" is used to refer to an unqualified hostname, being a portion of a computers FQDN that can be found before the first period in the FQDN.

The term "Universal Time (UTC)" is used to refer to the international standard time used for civil time and the Internet. The acronym UTC is used as a compromise between the acronym CUT (Coordinated Universal Time) used in English and the acronym TUC (Temps Universel Coordonné) used in French, therefore unofficially resulting in UTC being used for "Universal Time Coordinated" and "Universel Temps Coordonné".

The term "Cloud Computing" is used to refer to computing services provided over the Internet (or "cloud"), whereby shared resources, software, and information are provided to computers and other devices on demand.

The term "Application Programming Interface (API)" is used to refer to an interface or communication protocol for a software component (e.g. service, device, server, etc.) intended to exchange information or to be controlled by a party.

The term "Virtual machine (VM)" is used to refer to any virtual component associated to an IP address. More generally, a Virtual machine (VM) can be an emulation of a computer that runs in an isolated partition of a computer or a computer system that is implemented in software rather than hardware and that runs bytecode.

The term "Transmission Control Protocol/Internet Protocol (TCP/IP)" is used to refer to the standard for computer network communication, used in particular for the Internet.

The term "Uniform Resource Locator (URL)" is used to refer to the address of one of a web page, a ftp site, and audio stream or any other Internet resource.

The term "Network Time Protocol (NTP)" is used to refer to the networking protocol for clock synchronization between computer systems over packet-switched, variable-latency data networks.

The terms "Transport Layer Security (TLS)" and "Secure Sockets Layer (SSL)" are used to refer to cryptographic protocols designed to provide communications security over a computer network.

The term "Internet of Things (IoT)" is used to refer to the network of interconnected objects which are embedded with sensors, software, network connectivity and necessary electronics in order to allow the objects to connect and exchange data with other devices and systems over a network (e.g. over the Internet).

The term "computing device" is used to encompass computers, servers and/or specialized electronic devices which receive, process and/or transmit data. "Computing devices" are generally part of "systems" and include processing means, such as microcontrollers and/or microprocessors, CPUs or are implemented on FPGAs, as examples only. The processing means are used in combination with storage medium, also referred to as "memory" or "storage means". Storage medium can store instructions, algorithms, rules and/or data to be processed. Storage medium encompasses volatile or non-volatile/persistent memory, such as registers, cache, RAM, flash memory, ROM, as examples only. The type of memory is of course chosen according to the desired use, whether it should retain instructions, or temporarily store, retain or update data.

One skilled in the art will therefore understand that each such computing device typically includes a processor (or multiple processors) that executes program instructions stored in the memory or other non-transitory computer-readable storage medium or device (e.g., solid state storage devices, disk drives, etc.). The various functions, modules, services, units or the like disclosed hereinbelow can be embodied in such program instructions, and/or can be implemented in application-specific circuitry (e.g., ASICs or FPGAs) of the computing devices. Where a computer system includes multiple computing devices, these devices can, but need not, be co-located. In some embodiments, a computer system can be a cloud-based computing system whose processing resources are shared by multiple distinct business entities or other users.

It should be appreciated by those skilled in the art that any block diagrams herein represent conceptual views of illustrative circuitry embodying the principles disclosed herein. Similarly, it will be appreciated that any flow charts and transmission diagrams, and the like, represent various processes which may be substantially represented in computer readable medium and so executed by a computer or processor, whether or not such computer or processor is explicitly shown.

Figure 2:
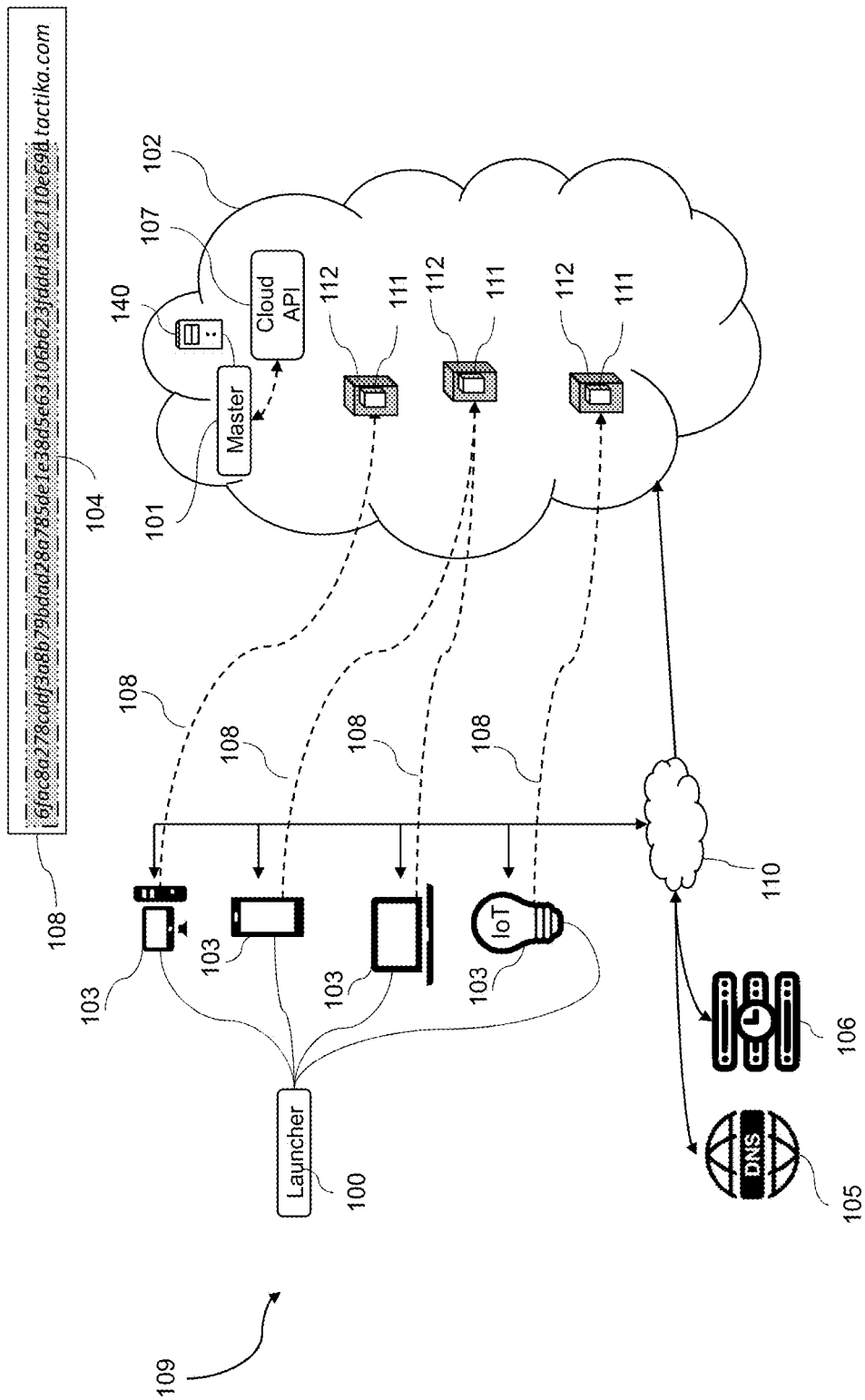
FIG. 2 is a schematic representation of the system for securing access to specific network assets, in accordance with an embodiment where the virtual machines of the system are configured to operate as servers hosting the network assets.

Referring generally to FIGS. 1 and 2, in accordance with one embodiment, there is provided a system 109 for securing access to specific network assets 111, 113, 115. As will be described in more details below, the system 109 is operative to generate a unique, complex, secret and temporary hostname 104 and to use it to generate a unique, complex, secret and temporary FQDN referred herein as the One Time Hostname (OTH) 108. The generated One Time Hostname (OTH) 108 is configured to be stored in a Domain Name System server (DNS server) 105. In an embodiment, the DNS server 105 of the system 109 is a DNS server dedicated to resolving the OTH 108.

As will be described in more details below, in an embodiment, to increase the security of the system 109, the generated OTH 108 is valid (or active) only during a limited time period which is referred herein as a "cycle". As will again be described in more details below, after each cycle, the OTH 108 expires and a new one is generated, thereby providing a dynamic architecture which is periodically modified (modified at each cycle), rather than a static one, consequently improving the security level of the system 109.

The OTH 108 is a link allowing access a specific network asset 111, 113, 115 through a network 110. In the system described herein, the OTH 108 will only be known to the specific client devices 103 associated with a client who is allowed to access the network asset 111, 113, 115. In a case where multiple clients are granted access to the same network asset 111, 113, 115, the multiple clients can either use the same OTH 108 or each use a client specific OTH 108 to access the network asset 111, 113, 115. Hence, the OTH 108 can be considered the cornerstone of the system 109, with the system 109 having a specific architecture designed to dynamically generate temporary OTH 108 and use the generated OTH 108 in order to control the access to the network assets 111, 113, 115 (and thereby prevent unwarranted access to the network assets 111, 113, 115).

In an embodiment, the OTH 108 is generated using a combination of a shared secret key 300, a UTC string indicative of the universal time (UTC) at the time of the generation of the temporary hostname 104, the cycle time and at least one mathematical and/or logical operation used for processing the result of the combination of the shared secret key and the UTC string.

The shared secret key 300 can be any string of character, such as, for example and without being limitative a password, a passphrase, a number, an array of randomly chosen characters or bytes, etc. One skilled in the art will understand that In an embodiment, the system 109 uses the Internet source of Universal Time Coordinated (UTC) 106 for time reference and synchronization.

After being generated, the temporary hostname 104, is appended to the domain name associated with the network asset 111, 113, 115 to generate the FQDN used as OTH 108. For example, and without being limitative, in FIGS. 4 and 6, the domain name used as domain name associated to the network asset 111, 113, 115 to be protected by the system 109 is "tactika.com". One skilled in the art will however understand that, in alternative embodiments (not shown), any domain name could be used for appending to the OTH 108 and define the FQDN.

In view of the above, for example, and without being limitative, in an embodiment, the OTH 108 can be generated using the following steps:

1) Concatenating the numerical values of the current UTC (e.g. time+date+month+year or any other sequence using a combination of the time and/or the date and/or the month and/or the year, for example using the gmtime( ) function in C language or the like) to generate a UTC string.

One skilled in the art will understand that any UTC string representing UTC time values at the time of creation of the OTH 108 could be used. The degree of precision of the UTC values used can vary according to the length of the cycle (i.e. a higher degree of precision of the UTC will be required for shorter cycles and vice-versa—with the degree of precision being at least sufficient to differentiate between two different cycles.

2) Applying an XOR logical operator between the UTC string generated at step 1) and the shared secret key 300, to generate an XOR string.

One skilled in the art will understand that, in an alternative embodiment, for example and without being limitative, a different logical operator could be used to generate a logical string.

3) Hashing the XOR string (or other logical string) generated at step 2), for example and without being limitative using the SHA256 cryptographic hash function (or other cryptographic hash function), to generate a hash value.

Again, one skilled in the art will understand that, in an alternative embodiment a cryptographic hash function different from the above-mentioned SHA256 cryptographic hash function could be used.

4) Extracting the last 63 characters (or a different sequence of characters of the hash value having a length which is in accordance with the rules of the DNS system) from the hash value generated at step 3) to generate a string corresponding to the hostname 104;

5) Concatenating the hostname 104 generated at step 4) with the corresponding domain name to generate the FQDN used as OTH 108.

As mentioned above, the generated OTH 108 is a Fully Qualified Domain Name (FQDN), which therefore allows the creation of a host record in the DNS server 105 corresponding to this specific OTH 108, as will be described in more details below.

One skilled in the art will easily understand that, in alternative embodiments, different operations could be performed and/or a different sequence of operations could be used to generate the OTH 108. For example and without being limitative, the numerical values of the current UTC could be arranged and/or concatenated differently in the UTC string; different mathematical operations could be performed on the numerical values of the current UTC string and the shared secret key, a different cryptographic hash function could be used, a different sequence of character could be extracted from the hash, etc. In other words, other alternative methods or algorithms for combining the shared private key with the universal time (UTC) at the time of the creation of the OTH 108 and the time of the cycle, hashing the result and/or extracting a portion of a generated hash value can be used. For example, and without being limitative, in an embodiment, the hostname 104 could be generated using a method based on the algorithm described in the document "*Request for Comments #6238 TOTP: Time-Based One-Time Password Algorithm*". In fact, one skilled in the art will readily understand that any algorithm or method which achieve the objective of generating an OTH 108 that is unique, temporary and hard to guess could be used.

In an embodiment and as will be described in more details below, in order to make the OTH 108 temporary, the system 109 is configured to regenerate a new OTH 108 after the limited and predetermined time period has elapsed (i.e. after a cycle has been performed and the previously active OTH 108 has expired). In other words, a specific active OTH 108 is coupled to the network asset 111, 113, 115 (accessed through the proxy or the firewall 112) for a predetermined period of time before expiring, the predetermined time period corresponding to the above-mentioned cycle. Once the OTH 108 has expired, the system 109 generates a new active OTH 108 used to access the network asset 111, 113, 115.

One skilled in the art will understand that the length of a cycle (i.e. the time period where an OTH 108 remains valid) can vary. For example, and without being limitative, in an embodiment, each cycle can last between about 30 minute and several days. In an embodiment, the cycle length (i.e. the lifetime of an OTH 108 being linked to a specific network asset 111, 113, 115) can vary depending on the security level required for the associated network asset 111, 113, 115. Hence, the cycle length of an OTH 108 associated to network assets 111, 113, 115 requiring a higher level of security can be shorter than the cycle length of an OTH 108 associated to network assets 111, 113, 115 requiring a lower level of security. Similarly, the cycle lengths could differ for OTH 108 of different clients depending on the level of security desired (or required) for the client.

In an embodiment, the system 109 includes a client-side module 100 (referred herein as a "launcher") and a server-side module 101 (referred herein as a "master") cooperating with a cloud infrastructure 102, which will be detailed below. The launcher 100, the master 101 and the cloud infrastructure 102 are each connected to a data communication network 110 using a TCP/IP communication protocol. One skilled in the art will understand that the data communication network 110 allowing data communication between the launcher 100, the master 101 and/or the cloud infrastructure 102 can be any type of data connection which provides a network that allows data transfer therebetween. For instance, and without being limitative, the data communication network 110 can be a Local Area Network (LAN), a Personal Area Network (PAN), a Metropolitan Area Network) MAN, a Wide Area Network (WAN) or a combination thereof. The communication network 110 can be created using a wired connection, a wireless connection or a combination thereof. In the case where the data communication network 110 includes a wireless connection, the launcher 100, the master 101 and/or the cloud infrastructure 102 can be connected to a mix of wireless and wired communication hardware components (e.g. receiver/transceiver) to exchange data therebetween over the network 110. As mentioned above, in an embodiment the devices connected to the network 110 use the TCP/IP protocol suite to establish and maintain a data communication over the network 110.

The launcher 100, the master 101 and the cloud infrastructure 102 cooperate to allow only the client devices 103 having previously obtained (or generated) a valid OTH 108 corresponding to a specific network asset 111, 113, 115 to request and access this network asset 111, 113, 115.

Server-Side

Figure 3:
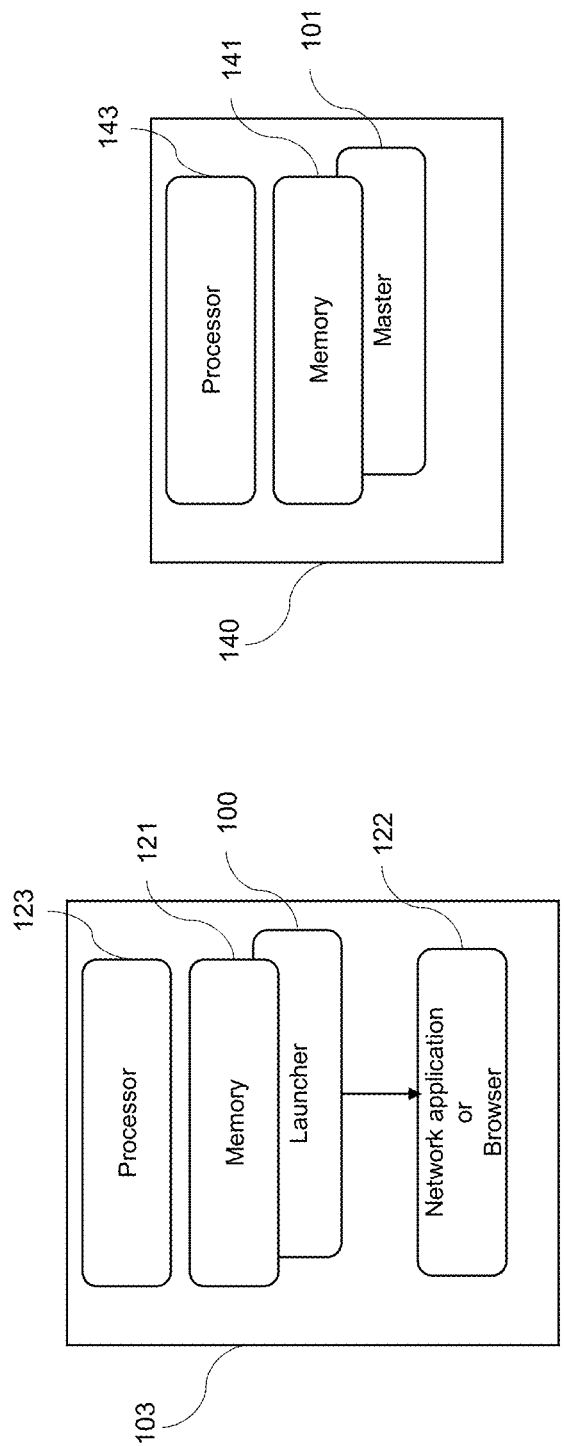
FIG. 3a a is a schematic representation of a client device having a client-side module stored in a memory thereof.
FIG. 3b a is a schematic representation of a computing device having a server-side module stored in a memory thereof.

Referring to FIGS. 1, 2 and 3b, on the server-side, the system 109 for securing access to network assets 111, 113, 115 includes the master 101 cooperating with the cloud infrastructure 102. In an embodiment, the master 101 and the cloud infrastructure 102 are together configured to manage the OTH 108, to provide a secure path for client devices 103 to access an associated network asset 111, 113, 115 using the launcher 100, which will be described in more details below.

In an embodiment, the master 101 is a server-side module stored in a memory 141 of a computing device (e.g. a server) 140 connected to the network 110. In an embodiment, the computing device 140 can be part of the cloud infrastructure 102 or be in data communication therewith, via the network 110. One skilled in the art will understand that, in alternative embodiments, the master 101 can be installed on any computing device (i.e. any type of computer or device) connected to the network 110. In an embodiment, the master 101 can be implemented as a virtual machine (VM) on a computing device connected to the network 110.

In an embodiment, the cloud infrastructure 102 includes virtual machines (VMs) dynamically created and destructed by the master 101, as will be described in more details below. In an embodiment, the VMs 112 are components of the cloud infrastructure 102 managed through an API 107 of the cloud infrastructure 102.

As mentioned above, in the course of the present description, the term "virtual machine (VM)" is used to refer to any virtual component associated to an IP address. Hence, this term should not be interpreted restrictively and could, for example and without being limitative, refer to a virtual server, a virtual container or any software or function generating a virtual component associated to an IP address. One skilled in the art will also understand that each VM can be standalone component (i.e. a single VM) or a group of components (i.e. a group of VMs) for offering an Internet service. The setup can be simple or complex. In an embodiment, the cloud infrastructure 102 is configured to hold all the "images" required to provisioning the VMs 112, 114.

The above described system 109 can be used, for example and without being limitative in two main scenarios corresponding to different embodiments of the system.

In a first scenario shown in FIG. 1, the plurality of VMs 114 each operate as a firewall or reverse proxy server accessible only using the corresponding OTH 108 and therefore act as an intermediary between the client devices 103 and the corresponding network asset 113, 115. Each VM 114 has an IP address associated with the OTH 108 specifically generated for the client (or group of clients) and can only be accessed using the OTH 108 to request the network asset 113, 115. The VM 114 can subsequently send requests the network assets 113, 115 and receive response therefrom to act as an intermediary relaying data between the client device 103 and the network assets 113, 115, therefore allowing the client device 103 to access the network asset 113. In other words, in this scenario, the VM 114 relays traffic and provides an intermediary that does not permit direct access to the network asset 113, 115 by the client device 103 or any other device connected to the network 110, thereby preventing malicious activities, such as, for example and without being limitative, denial of service attacks, scanning by bots looking for vulnerable hosts, forbidden access attempts, etc.

In a second scenario shown in FIG. 2, the VMs 112 each operate as a server accessible only using the corresponding OTH 108. Each VM 112 has an IP address associated with the OTH 108 specifically generated for the client (or group of clients) and can only be accessed using the OTH 108 to request the network asset 111. In other words, the VM 112 is a temporary server hosting the corresponding network asset 111. This time limited existence of each VM can prevent malicious activities, such as, for example and without being limitative, denial of service attacks, scanning by bots looking for vulnerable hosts, forbidden access attempts, etc. For example and without being limitative, in an embodiment, the VMs 112 can be created from a copy of an image of a server hosting the corresponding network asset 111.

Referring back to FIGS. 1 and 2, in both of the above described scenario, in order to allow access to a network asset 111, 113, 115 (i.e. a resource, a server or a service) using the OTH 108 generated for the client (or group of clients), the information regarding the OTH 108 and the associated IP address of the VM 112, 114 must be entered in a DNS server 105 and must be kept up to date, taking into account that each one of the VMs 112, 114 is temporary, the VMs 112, 114 being dynamically created and destructed by the master 101. In other words, each time a new OTH 108 is generated by the master 101 (e.g. in order to generate a new FQDN with current UTC data, after an associated previously active OTH 108 has expired), a new VM 112, 114 associated to the newly created OTH 108 is created by the master 101 and the VM associated with the previous OTH 108 which is now expired can be killed (or destroyed). When the new VM 112, 114 is created, the information regarding the newly generated OTH 108 and the associated IP address of the VM 112, 114 must be stored in the DNS server 105. Similarly, the information regarding the expired OTH 108 and the associated IP address of the associated VM 112, 114, which has been deleted, can be cleared from the DNS server 105.

The DNS server 105 is a service configured to store host records each including the IP address of one of the VMs 112, 114 and the corresponding OTH 108 associated thereto. In other words, the DNS server 105 contains a database of public IP addresses and their associated FQDN (each combination can be referred to as a "host record"), and which is used to resolve, or translate, the hostnames to IP addresses, when requested. For example and without being limitative, the DNS server 105 can be a cloud service with an API to manage it.

To initiate the system 109, in an embodiment, the master 101 is configured to generate a share secret key 300 for a client or a group of clients of the system 109. As mentioned above, the generated shared secret key is used by the master 101 and the launcher 100 in the generation of the OTH 108. This shared secret key 300 is a secret and shared key associated to a client or a group of clients and the master 101. It will be understood that, whenever the master 101 generates an OTH 108, the master 101 uses the shared secret key associated to the client or the group of clients for which the OTH 108 is generated. As will be described below, in an embodiment, the shared secret key 300 is also transmitted to the launcher 100 client devices 103 of the associated client for the launcher 100 to generate its own OTH 108 which is used to access the network asset 111, 113, 115. One skilled in the art will understand that the master 101 can therefore manage many shared secret keys for many clients or many groups of clients simultaneously. In an embodiment, the master 101 can also destroy a shared secret key and/or stop a cycle to end the access of a network assets 113, 114 (e.g. by destroying the corresponding VM 112, 114 and/or deleting the associated host record in the DNS server 105).

In an embodiment, the master 101 is also configured to generate a cycle time 200 associated to the client or the group of clients, the cycle time defining the time span for which the generated OTH 108 will remain valid before expiring (and a new OTH 108 being generated).

Figure 4:
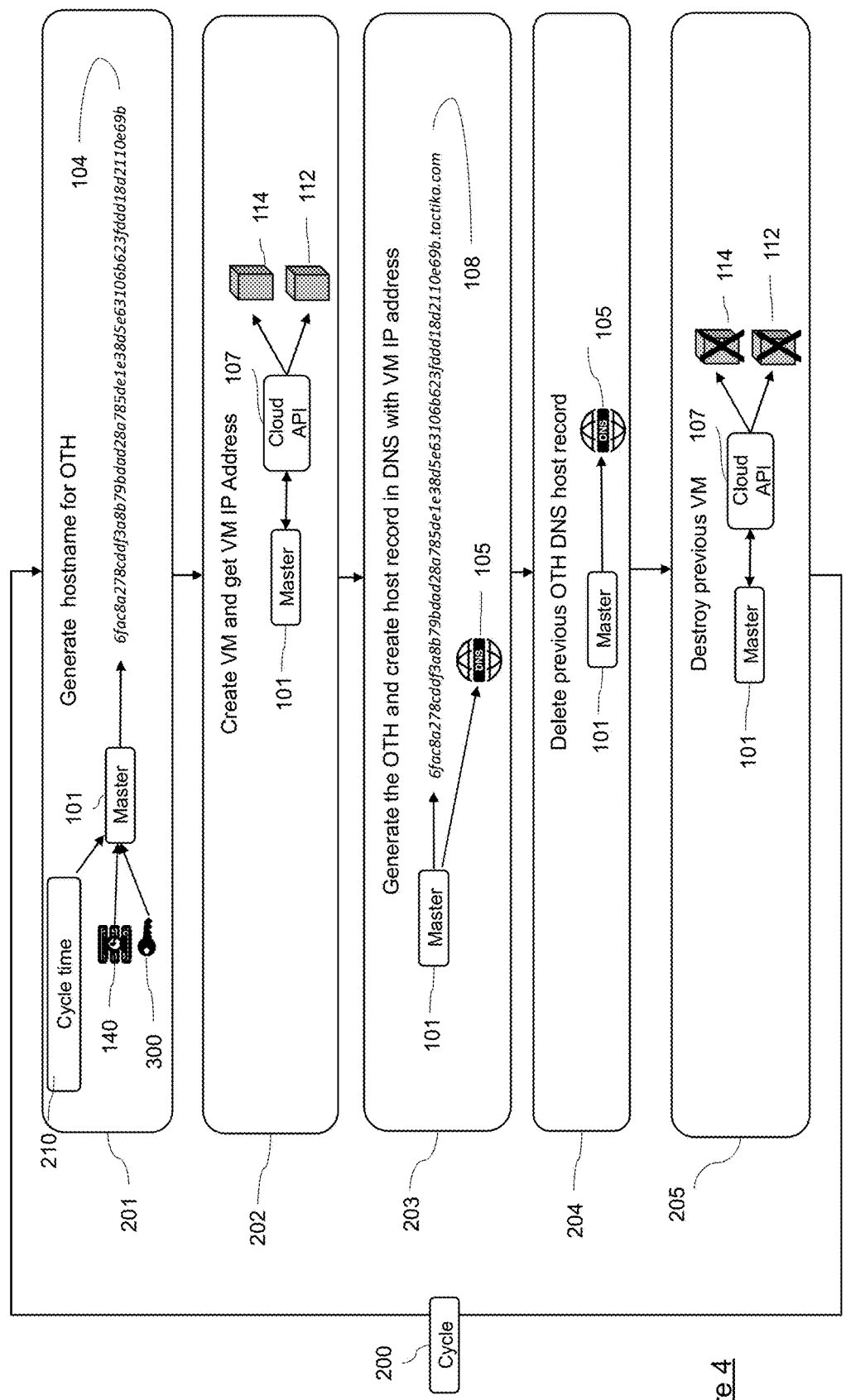
FIG. 4 is a schematic representation of a sequence of operations performed by a server-side module of the system of FIG. 1 or FIG. 2, for each cycle, in order to generate and update the components of the system required for functioning thereof, in accordance with an embodiment.

In view of the above, FIG. 4 shows a sequence of operations performed by the system 109, on the server-side 101, for each of the above-mentioned cycles. The above-described sequence of operations allows the system 109 to be dynamic and periodically changing (i.e. changing at each cycle 200) with the information relative to the current state of the system 109 always being up to date. The cycles 200 can be continuously repeated until the master 101 stops.

At the beginning of the cycle, the master 101 is configured to generate a new temporary hostname 104 (see step 201) and append it to the domain name associated with the network asset 111, 113, 115 to be secured, in order to generate the OTH 108 (see step 203). The OTH can be generated in accordance with the teachings provided above regarding the different possible operations or sequence of operations for generating the OTH 108. The newly generated active OTH 108 will remain active during the time period corresponding to the cycle and will expire at the end of the cycle 200 (see steps 204, 205).

Subsequently to the generation of the OTH 108, the master 101 is configured to create a corresponding VM 112, 114 and obtain the IP address associated to this VM 112, 114, for example and without being limitative, from the management API of the cloud infrastructure 102 (see step 202). The master 101 is further configured to create a host record of the OTH 108 and the IP address of the associated VM 112, 114 in the DNS server 105 associated to the domain in which the corresponding network asset 111, 113, 115 is hosted (see step 203). Hence, the master 101 dynamically updates the hostnames in the DNS server 105 of the domain to reflect the current state of the group of VMs 112, 114.

In an embodiment, for the creation of the host record, the master 101 respects the following rules: 1) the OTH 108 must be case-insensitive; 2) the OTH 108 must start and end with a letter or digit; 3) the OTH 108 must contain only letters and/or digits; 4) the total length of the hostname 104 must not exceed 63 characters. These rules are based on currently enforced DNS specifications. One skilled in the art will however understand that, over time, the rules followed for the creation of the OTH 108 could be different to adapt to new DNS specifications applicable at the time for the creation of the host record.

In an embodiment, the master can manage the many groups of clients and network assets, each of them having theirs specifics OTH 108. In other words, the master 101 can create many OTH 108 (and corresponding VMs 112, 114) for one cycle. In such a case, the master 101, generates all the corresponding VMs 112, 114 and dynamically updates the hostnames in the DNS server 105 of the domain to reflect the current state of all the VMs 112, 114.

At the end of the cycle, the master 101 is configured to delete the OTH host records in the DNS server 105 corresponding to expired OTH 108. The master 101 also destroys the previous VM(s) 112, 114 in the cloud infrastructure 102. One skilled in the art will understand that, in alternative embodiments, the master 101 can delay the destruction of the VMs 111 and 112 and/or the corresponding host records in the DNS server 105, for example to proceed to batch destruction of the VMs 112, 114 which are not active anymore.

In order to allow the system 109 to operate, the master 101 must always be up and running and performing the sequence of operations as discussed above and shown in FIG. 4.

Client-Side

Referring to FIGS. 1, 2 and 3a, on the client-side, the system 109 includes the launcher 100 stored in a memory of a client device 103 associated to the corresponding client, to allow the client to access the network asset 111, 113, 115 using the client device 103. For example and without being limitative, the client device 103 can be a personal computer used by a client, a smartphone used by a client, a connected object operating as a client (i.e. an object connected to the Internet as part of the Internet of Things (IoT)), or any other computing device connected to a network and requiring access to the network asset 111, 113, 115.

In an embodiment, the launcher 100 is therefore a module stored in a memory of the client device 103. For example and without being limitative, in an embodiment, the launcher 100 is a module including instructions stored in a memory of the client device 103 and executable by the processor of the client device 103 to operate as an application running on the client device 103. The client device 103 connects to the corresponding network asset 111, 113 115 to acquire the corresponding data, with the acquired data being subsequently used by the application or displayed to the user through the application (or through a user interface used for interaction with the application). In an alternative embodiment, the launcher 100 can also be a module including instructions stored in the memory of an IoT connected device and executable by the processor of the IoT connected device for providing a network connection between the IoT connected device and the associated network asset 111, 113, 115.

Figure 5:
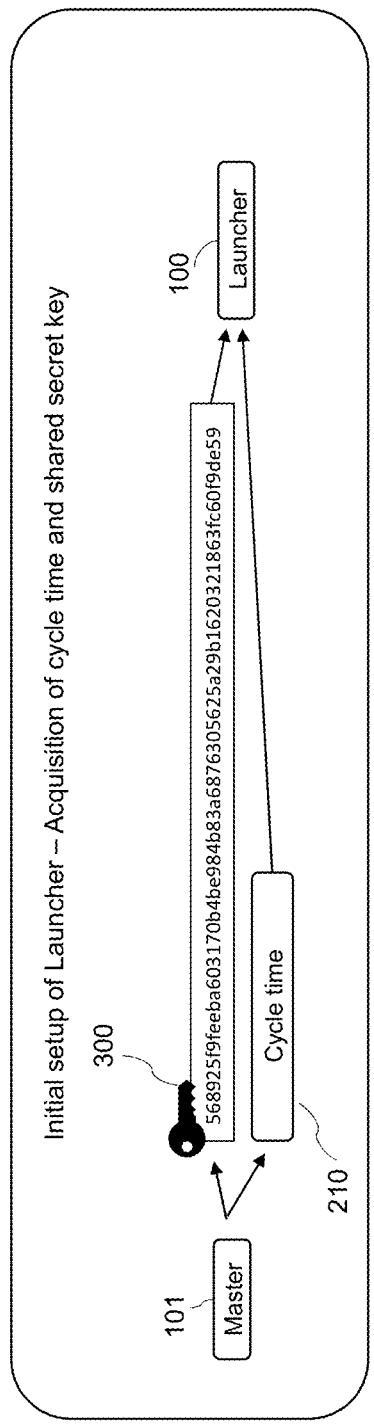
FIG. 5 is a schematic representation of initial setup operations performed by the system of FIG. 1 or FIG. 2, in accordance with an embodiment.

Referring to FIG. 5, the launcher 100 is initially set up by the acquisition of the cycle time 210 and the shared secret key 300 generated by the master 101 for the client associated to the device 103. In an embodiment, the cycle time 210 and the shared secret key 300 are determined/generated by the master 101 and are subsequently transmitted to the launcher 100 through a secure channel. For example and without being limitative, the secure channel for the transmission of the cycle time 210 and the shared secret key 300 to the launcher 100 can be a temporary QR code generated by the master 101 and scannable by the client device 103 having the launcher 100 installed thereon, a secure web page accessible by the client device 103 having the launcher 100 installed thereon, etc. It will be understood that several methods or systems could be used to provide the secure channel for the transfer of the cycle time 210 and the shared secret key 300. Indeed, any systems or method which allow transfer of the data relative to the cycle time 210 and the shared secret key 300 generated by the master, to the launcher 100, can be used. It should be noted that the shared secret key 300 can be unique to a specific client or be shared by a group of clients which are allowed to access the network asset 111, 113, 115.

One skilled in the art will understand that, in an alternative embodiment, only the shared secret key 300 can be transmitted to the launcher 100 through the secure channel. In such an embodiment, the cycle time can be, for example and without being limitative, a default cycle time for the system 109.

Figure 6:
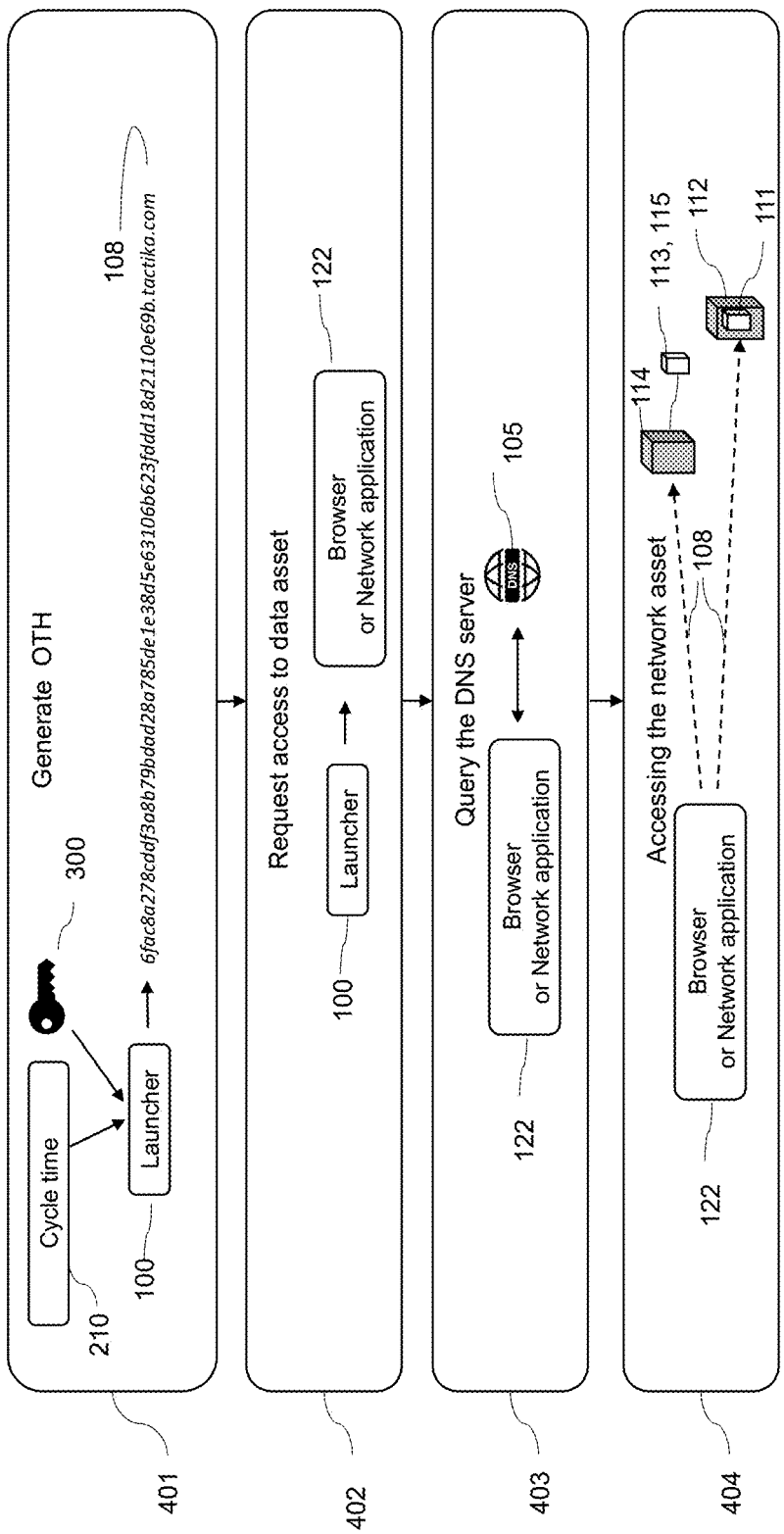
FIG. 6 is a schematic representation of a sequence of operations performed by the client-side module of the system of FIG. 1 or FIG. 2, in order to access a network asset, using a client device, in accordance with an embodiment.

Referring to FIG. 6, in an embodiment, after acquiring the secret key 300, the launcher 100 is configured to generate a hostname 104 and an OTH 108 (see step 401) using the secret key 300. In an embodiment, the OTH 108 can be generated upon a request provided to the launcher 100 (i.e. on demand), by a client, for example through an app installed on the client device 103.

The master 101 manages the time to live for each VM 112, 114 (i.e. VM operating as proxy or firewall 114 or VM storing the network asset 112) to give the best service for the clients. Hence, in an embodiment, the master 101 can be configured to destroy the entry in the DNS server 105 corresponding to the OTH following each cycle 200 but can keep the VM storing the network asset 112 or the CM operating as a proxy or firewall 114 online for one or more cycles following destruction of the entry corresponding to a specific OTH 108 in the DNS server 105.

One skilled in the art will understand that the generation of the OTH 108 by the launcher 100 and the generation of the corresponding VMs 112, 114 by the master 101 is synchronized (i.e. the same OTHs 108 are generated by the launcher 100 and the master 101 for each cycle), such that OTH data are always matching for the launcher 100 and the master 101 (i.e. the active OTH 108 used by the launcher 100 always has an associated VM 112, 114 created by the master 101 and is always referenced in the DNS server 105 in accordance with the above-described sequence of operations of the server-side, for each cycle 200). The OTH 108 generated by the launcher 100 and the master 101 for each cycle 200 are also identical, as they are generated using the same secret key and UTC data and according to the same rules of creation (i.e. using the same sequence of operations for creation thereof).

Still referring to FIG. 6, once the OTH 108 is generated (following step 401), the launcher 100 is configured to request access the corresponding network asset 111, 113, 115 using the specific active OTH 108. In an embodiment, the launcher 100 uses a browser or any other network application having networking capability (see step 402) which allows access to data accessible on the data communication network 110 using an OTH 108, to access the network asset 111, 113, 115.

In an embodiment, the access to data accessible on the data communication network is performed via a resolver 130 (see step 403) used by the application with networking capability (e.g. the browser) to access the DNS server 105. Upon a request access to the network asset 111, 113, 115 using the specific OTH 108, the resolver queries the DNS server 105 to resolve the OTH 108 (i.e. to acquire the IP address of the corresponding VM 112, 114 associated to the specific OTH 108) (see step 403).

After acquiring the IP address of the corresponding VM 112, 114, the launcher 100 is configured to connect to the VM 112, 114 through the network 110 and access the network asset 111, 113, 115 with the VM 112, 114 either acting as an intermediary between the network asset 111, 113, 115 and the client device 103.

In view of the above, using the above described system 109, the data assets 111, 113, 115 cannot be accessed through by scanning of hosts (i.e. the path to access the data assets 111, 113, 115 cannot be guessed). Hence, the data assets 111, 113, 115 are shielded from unwarranted access or denial-of-service attack by malicious individuals or machines, as they require the knowledge of the OTH 108 which is unique, complex, temporary and continuously changing after each cycle 200.

The system 109 for securing access to specific network assets having been described in detail above, a method for securing access to the specific network assets will now be described.

In an embodiment, the method includes the initial step of generating a secret key 300 associated to a client or a group of clients.

In an embodiment, the method further includes a series of steps which will be repeated periodically, to ensure the temporary nature of the OTH used for accessing the associated network assets. In other words, the sequence described below will be repeated at each cycle, with a new active OTH being generated after a corresponding OTH has expired.

Referring again to FIG. 4, in an embodiment, the initial steps of a cycle include generating a secret hostname (step 201) and appending it to the domain name associated with the corresponding network asset to generate the OTH (step 203). As mentioned above, the OTH is generated using a combination of the shared secret key 300, the cycle time 210, a UTC string representative of the UTC at the time of the generation of the OTH and at least one mathematical and/or logical operation used for processing the result of the combination of the shared secret key and the UTC string. The detailed step according to an embodiment and other potential variants for generating the OTH and the OTH have been described above and will not be described herein for ease of description.

In an embodiment, the method also includes the step of creating a corresponding VM for each new active OTH and acquiring the IP address associated to the VM (step 202) which is assigned to the newly created OTH.

In an embodiment, the method further includes the steps of creating a host record of the OTH and the IP address of the associated VM in the DNS server associated to the domain in which the corresponding network asset is hosted (step 203), deleting the OTH host records in the DNS server corresponding to any expired OTH (step 204) (i.e. OTH no longer valid and for which a new OTH has been generated), and destroying expired VM(s) (step 205) (i.e. VM(s) associated to expired OTH and which are no longer required).

As previously mentioned, this series of steps is repeated at each cycle 200, to periodically change the OTH which can grant access to the network asset and update the structure of the network and the data of the DNS server to take into account that the OTH has changed and the corresponding VMs have also been changed.

In an embodiment, the method further includes providing a client-side module (hereinafter referred as the "launcher") installed on a network connected device and connectable to the network asset, through the corresponding VM.

Referring to FIG. 5, in an embodiment, the step of providing the client-side module includes initially setting up the launcher 100 by the acquisition of the secret key 300 generated by the master 101 for a client associated to the launcher 100. In an embodiment, it can further includes acquiring the cycle time 210 for the client (or group of clients) associated to the launcher from the master.

Referring to FIG. 6, in an embodiment, the step of providing the client-side module further includes, for example, on demand by a user or by a network application: generating a unique and temporary hostname (step 401) using a combination of the shared secret key, the cycle time, a UTC string representative of the UTC at the time of the generation of the OTH and at least one mathematical and/or logical operation used for processing the result of the combination of the key and the UTC string; and appending the unique and temporary hostname to the domain name associated with the network asset to generate the OTH (step 401).

In an embodiment, the method includes generating an identical OTH by the master and the launcher for each cycle.

In an embodiment, the method further includes the step of requesting access to the network asset using the OTH (step 402). In an embodiment, this step can be performed on demand on the client-side by the launcher, using an network application with a networking capability such as, for instance and without being limitative, a web browser. In an embodiment, the step of requesting access to the network asset further includes the steps of: querying the DNS server (step 403) to resolve the OTH (i.e. to acquire the IP address of the corresponding VM); and connecting to the VM through the network to access the network asset (step 404).

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention could be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited solely by the scope of the appended claims.

The invention claimed is:

1. A system for securing access to a network asset using a fully qualified domain name having a unique and temporary hostname, the system comprising:
    a client-side module stored in a memory of a client device connected to a network and configured to generate, on demand, the fully qualified domain name having the unique and temporary hostname;
    a server-side module stored in a memory of a computing device connected to the network, the server-side module being configured to periodically generate the fully qualified domain name having the unique and temporary hostname using a combination of a shared secret key associated to a client who is allowed to access the network asset, a time at generation representing Universal Time as a string and at least one logical operation;
    virtual machines each having an IP address associated to a corresponding fully qualified domain name having the unique and temporary hostname, each one of the virtual machines being configured to operate either as a server hosting the network asset, a network firewall, or as a reverse proxy between the client device having the client-side module stored in the memory thereof and the network asset, a new virtual machine being created each time a new fully qualified domain name having the unique and temporary hostname is generated and being destroyed after the corresponding fully qualified domain name having the unique and temporary hostname has expired; and
    a Domain Name System (DNS) server connected to the network and storing a database of host records each including a public IP address of one of the virtual machines and the corresponding fully qualified domain name having the unique and temporary hostname, the database of host records being updated each time a new virtual machine is created in the DNS server.

2. The system for securing access to a network asset of claim 1, wherein the server-side module and the client-side module are configured to generate the unique and temporary hostname at after a predetermined time period corresponding to a cycle time of the system has elapsed.

3. The system for securing access to a network asset of claim 1, wherein the server-side module is configured to create on the DNS server a corresponding host record for the fully qualified domain name having the unique and temporary hostname and the IP address of the associated virtual machine, each time a new virtual machine is created.

4. The system for securing access to a network asset of claim 3, wherein the server-side module is configured to delete the corresponding host record for the fully qualified domain name having the unique and temporary hostname and the IP address of the associated virtual machine, after the associated virtual machine is destroyed.

5. The system for securing access to a network asset of claim 1, the server-side module is configured to generate the fully qualified domain name having the unique and temporary hostname for each cycle, the server-side module and the client-side module generating an identical fully qualified domain name having the unique and temporary hostname during a cycle.

6. The system for securing access to a network asset of claim 1, wherein the client-side module is configured to connect to a corresponding one of the virtual machine through a browser or a network application, using the corresponding fully qualified domain name having the unique and temporary hostname, to access the network asset.

7. A system for securing access to a network asset using fully qualified domain names each having a unique and temporary hostname and each expiring after a cycle, the system comprising:
    a client device connected to a network and having a memory, the client device having a client-side module stored in the memory thereof;
    virtual machines each having an IP address and each being associated to one of the fully qualified domain names having the unique and temporary hostname, each one of the virtual machines being configured to operate either as a server hosting the network asset, as a reverse proxy, or as a firewall between the client device and the network asset;
    a Domain Name System (DNS) server connected to the network and configured to store host records each including the IP address of one of the virtual machines and the fully qualified domain name having the unique and temporary hostname associated thereto; and
    a computing device connected to the network and having a memory, the computing device having a server-side module stored in the memory thereof, the server-side module being configured to generate one fully qualified domain name having the unique and temporary hostname at the beginning of each cycle, the client-side module being configured to generate, on demand, the one fully qualified domain name having the unique and temporary hostname, the one fully qualified domain name having the unique and temporary hostname expiring at the end of the cycle, and, for each cycle, the server-side module being further configured to create one of the virtual machines corresponding to the generated fully qualified domain name having the unique and temporary hostname and to update the DNS server with a corresponding host record including the IP address of the virtual machine created in the cycle and the corresponding fully qualified domain name having the unique and temporary hostname, wherein at least one of the server-side module and the client-side module is configured to generate the unique and temporary hostname using a combination of a shared secret key associated to a client who is allowed to access the network asset, a time at generation representing Universal Time as a string and at least one logical operation.

8. The system for securing access to a network asset of claim 7, wherein the server-side module is configured to periodically destroy the virtual machine corresponding to an expired fully qualified domain name having the unique and temporary hostname.

9. The system for securing access to a network asset of claim 8, wherein the server-side module is configured to destroy the virtual machine corresponding to a last expired fully qualified domain name having the unique and temporary hostname, for each cycle.

10. The system for securing access to a network asset of claim 8, wherein the server-side module is configured to update the DNS server to remove the host records including the virtual machines corresponding to expired fully qualified domain names having the unique and temporary hostname.

11. The system for securing access to a network asset of claim 7, wherein the server-side module is configured to generate one fully qualified domain name having the unique and temporary hostname at the beginning of each cycle, the server-side module and the client-side module generating an identical fully qualified domain name having the unique and temporary hostname during a cycle.

12. The system for securing access to a network asset of claim 7, wherein the client-side module is configured to connect to the corresponding virtual machine through a browser or a network application, using the corresponding fully qualified domain name having the unique and temporary hostname, to request the network asset.

13. A method for securing access to a network asset using an active fully qualified domain name having a unique and temporary hostname, the method comprising:
for each cycle corresponding to a time period where the active fully qualified domain names having the unique and temporary hostname remains active before expiring, performing the steps of:
generating the unique and temporary hostname by combining a shared secret key and a time at generation representing Universal Time as a string;
appending the hostname to a domain name associated with the corresponding network asset to generate the active fully qualified domain name;
creating a corresponding virtual machine assigned to the active fully qualified domain name and acquiring the IP address associated to the virtual machine, the virtual machine being configured to operate either as a server hosting the network asset, as a reverse proxy, or as a firewall for requesting the network asset; and
creating an host record of the active fully qualified domain name and the IP address of the associated virtual machine in a Domain Name System (DNS) server associated to the active fully qualified domain name where the network asset is hosted.

14. The method for securing access to a network asset of claim 13, further comprising, for each cycle, performing the steps of:
destroying the corresponding virtual machine assigned to an expired fully qualified domain name; and
destroying the host record in the DNS server corresponding to the expired fully qualified domain name.

15. The method for securing access to a network asset of claim 13, further comprising the step of generating the shared secret key associated to a client or a group of clients.

16. The method for securing access to a network asset of claim 13, further comprising the step of requesting access to the network asset by a client-side module installed in a memory of a client device connected to a network, using the active fully qualified domain name.

17. The method for securing access to a network asset of claim 16, wherein the step of requesting access to the network asset comprises querying the DNS server to resolve the active fully qualified domain name and connecting to the corresponding virtual machine through the network, to access the network asset.

* * * * *